United States Patent
Tanaka et al.

[11] Patent Number: 6,167,006
[45] Date of Patent: Dec. 26, 2000

[54] OPTICAL INFORMATION RECORDING/ REPRODUCING APPARATUS BASED ON TRACKING CONTROL OF IRRADIATED LIGHT

[75] Inventors: Masahiko Tanaka, Yokohama; Kazuo Watabe, Funabashi, both of Japan

[73] Assignee: Kabushiki Kaisha Toshiba, Kawasaki, Japan

[21] Appl. No.: 08/623,923

[22] Filed: Mar. 28, 1996

[30] Foreign Application Priority Data

Mar. 31, 1995 [JP] Japan ..................................... 7-074335
Oct. 19, 1995 [JP] Japan ..................................... 7-271184

[51] Int. Cl.[7] ..................................................... G11B 7/09
[52] U.S. Cl. ................................... 369/44.26; 369/44.42; 369/44.24
[58] Field of Search ............................. 369/44.24, 44.23, 369/44.41, 44.42, 44.26, 118, 112

[56] References Cited

U.S. PATENT DOCUMENTS

| | | | |
|---|---|---|---|
| 4,422,168 | 12/1983 | Ito et al. ................................. | 369/44.24 |
| 4,525,826 | 7/1985 | Nakamura et al. ..................... | 369/44.42 |
| 4,742,218 | 5/1988 | Nakamura et al. ..................... | 369/44.42 |
| 4,945,529 | 7/1990 | Ono et al. ............................... | 369/44.12 |
| 5,017,768 | 5/1991 | Takagi ..................................... | 369/44.41 |
| 5,150,342 | 9/1992 | Nagahara et al. ..................... | 369/44.41 |
| 5,199,022 | 3/1993 | Suzuki et al. ........................... | 369/13 |

FOREIGN PATENT DOCUMENTS

| | | |
|---|---|---|
| 57-050330 | 3/1982 | Japan . |
| 5979438 | 5/1984 | Japan . |
| 5-029969 | 5/1993 | Japan . |

*Primary Examiner*—Thang V. Tran
*Attorney, Agent, or Firm*—Pillsbury Madison & Sutro LLP

[57] ABSTRACT

An optical information recording/reproducing apparatus for optically recording/reproducing information by irradiating a track on a recording medium with a light comprises: a detecting circuit, a tracking error signal producing circuit, and a tracking control circuit. The detecting circuit selectively detects a circular area having a diameter smaller than a diameter of a light beam reflected from the recording medium and obtains an output signal corresponding to the detected circular area. The tracking error signal producing circuit produces, from the output signal of the detecting circuit, a tracking error signal indicating a shift in a position of a light beam irradiated on the recording medium in a track width direction. The tracking control circuit controls an irradiation position of a light beam irradiated on the recording medium in the track width direction based on the tracking error signal.

11 Claims, 11 Drawing Sheets

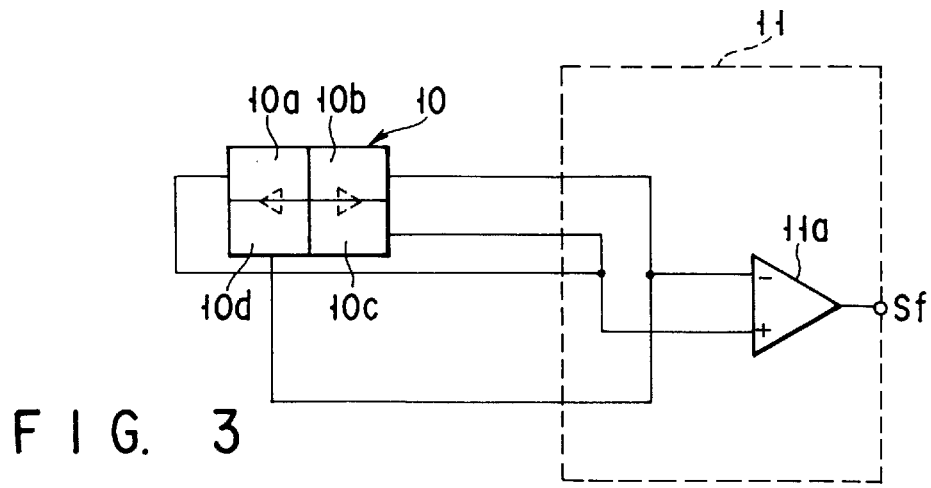
F I G. 3
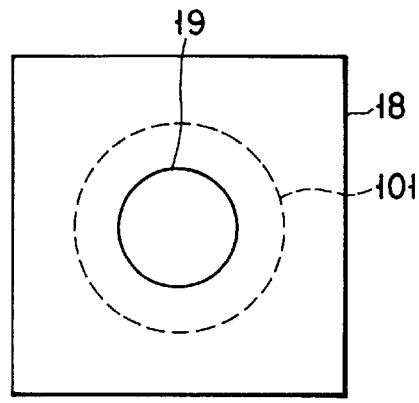
F I G. 4
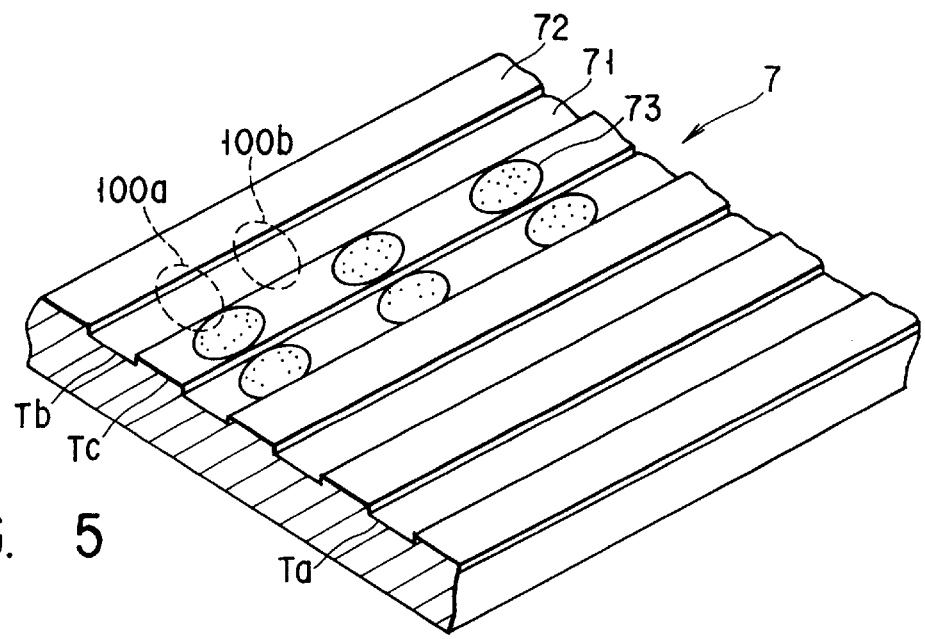
F I G. 5

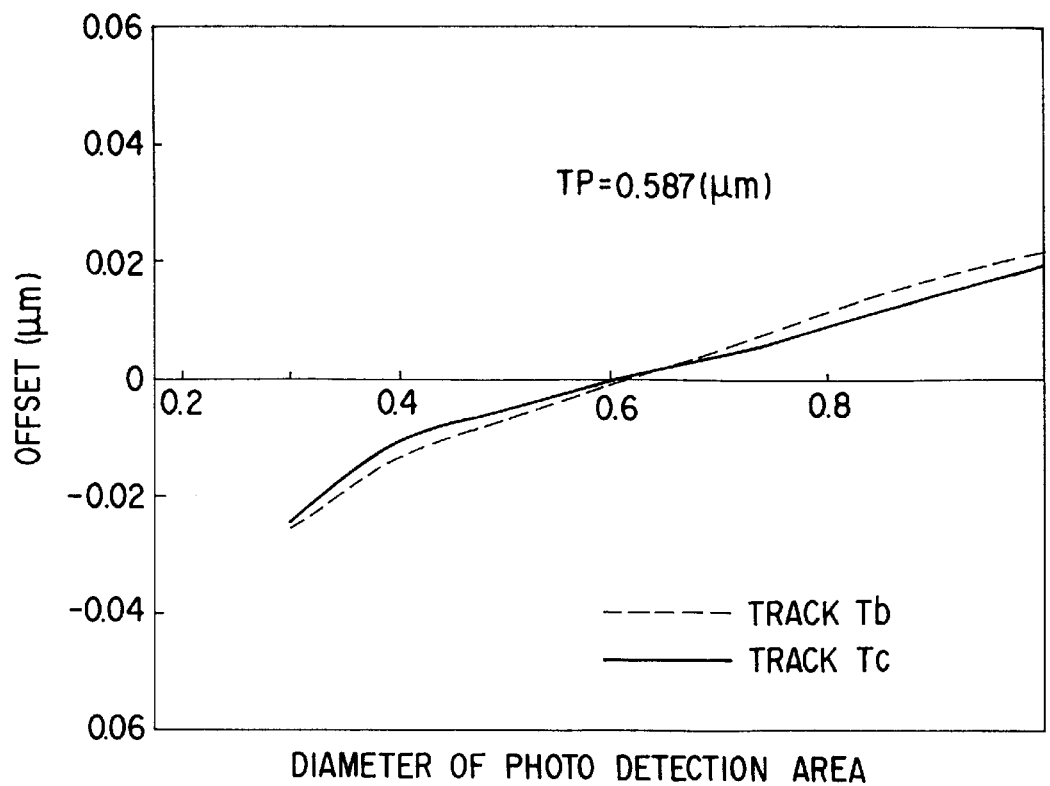
F I G. 8
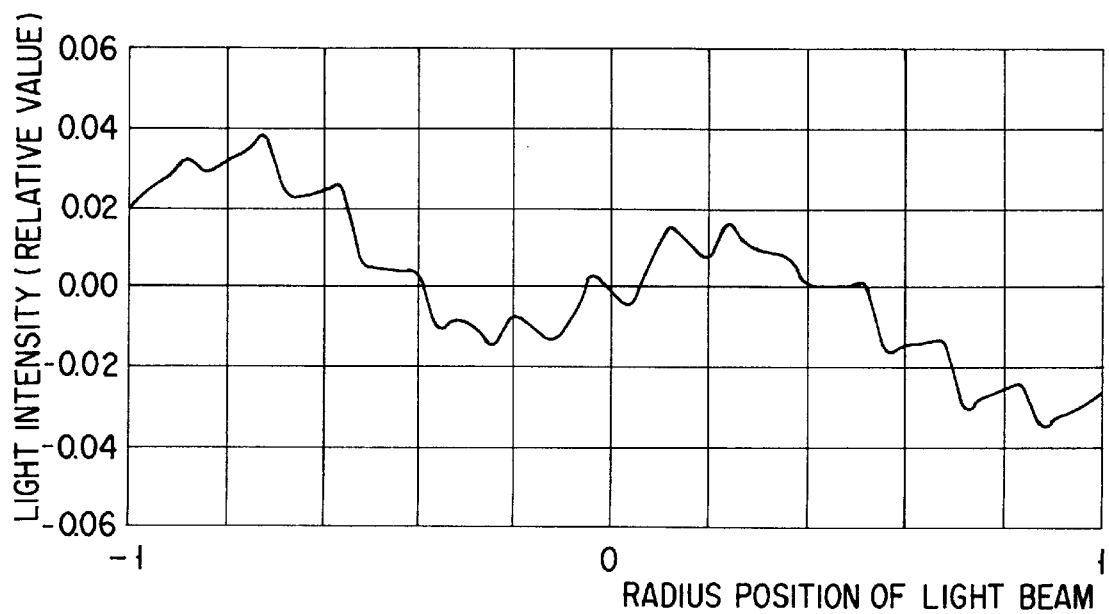
F I G. 10

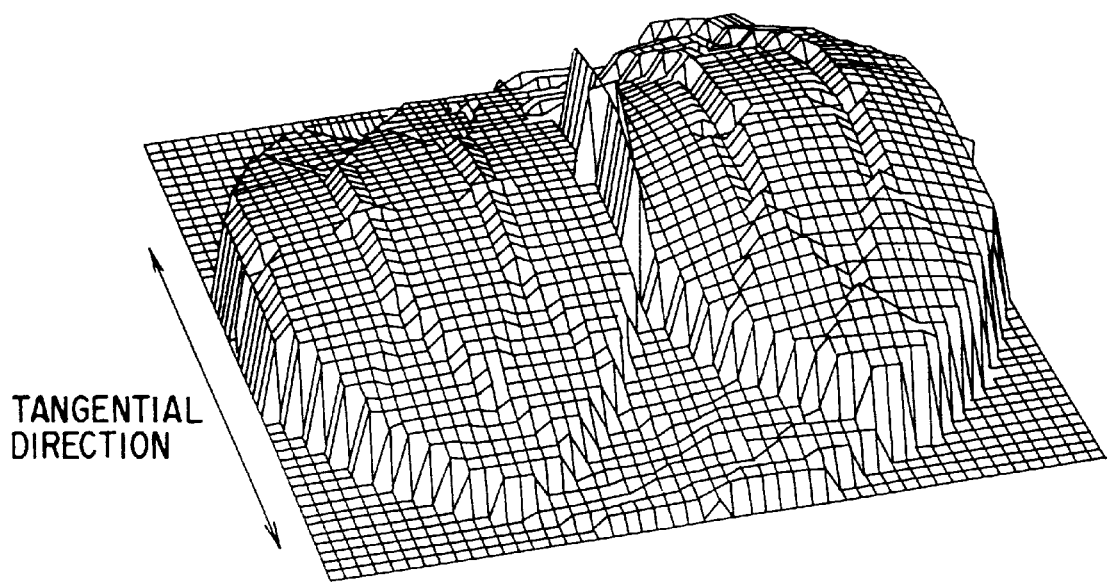
F I G. 12A
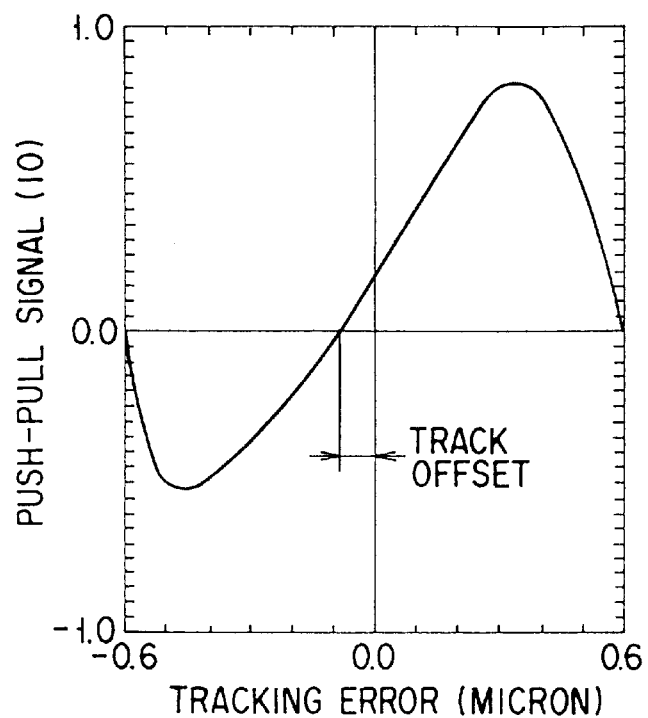
F I G. 12B

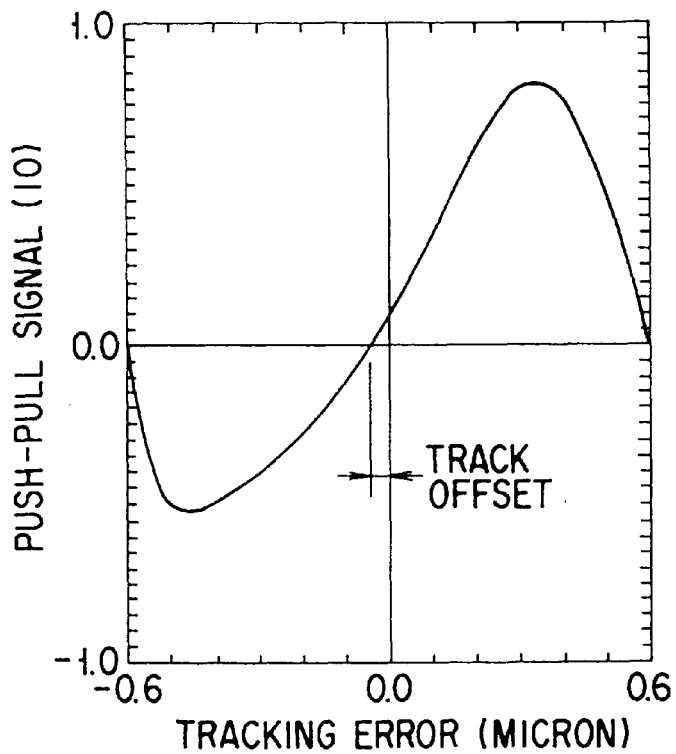
F I G. 13
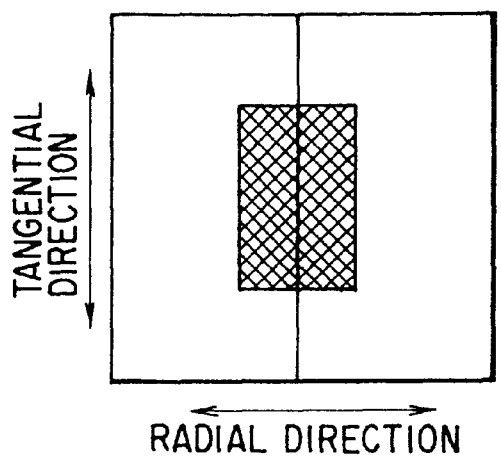
F I G. 14

OPTICAL INFORMATION RECORDING/REPRODUCING APPARATUS BASED ON TRACKING CONTROL OF IRRADIATED LIGHT

BACKGROUND OF THE INVENTION

1. Field of the Invention

The present invention relates to an optical information recording/reproducing apparatus such as an optical disk apparatus and the like for recording/reproducing information by irradiating a recording medium with light beams. More particularly, the invention relates to an optical information recording/reproducing apparatus capable of effectively reducing an offset produced in a tracking error signal because of light diffracted by recording marks on adjacent tracks.

2. Description of the Related Art

An optical information recording/reproducing apparatus for recording/reproducing information by irradiating a recording medium such as a phase change medium with light beams has actually been used as an optical disk apparatus. Information is recorded on an optical disk with a recording mark formed by means of the phase change in the recording film caused by irradiation by light beams. This recorded information is reproduced by detecting a change in intensity of the reflected light beams from the optical disk depending on existence of the recording mark.

In a conventional general optical disk apparatus, recording/reproducing of information is performed only by either a groove or a land on an optical disk. The groove is for guiding light beams and formed on the optical disk along a circumferential direction thereof in a shape of concentric circles or spiral. The land is an area held between grooves having a height different from the groove. Only using either the groove or the land is done for recording/reproducing operations.

In the conventional optical disk, tracks in which recording marks are formed exist only in the groove or the land. In the optical disk on which information is recorded/reproduced only using the groove, adjacent tracks are adjacent grooves sandwiching a land, while in the optical disk having tracks in the lands adjacent lands sandwiching a groove are the adjacent tracks. In these cases, track intervals are equal to land or groove widths.

In recent years, research and development have been directed toward higher density recording in an optical disk apparatus. As a method of this, a land and groove recording system for recording information both in a land and a groove is known (Japanese Patent Application KOKAI Publication No. 57-50330). According to this land and groove recording system, there are almost no track intervals because tracks exist both in the groove and the land and track pitches are very narrow. Reproduction of recorded information is, as in the case of the conventional apparatus, performed by detecting a change in intensity of reflected light beams from an optical disk. Because of the narrow track pitches, however, cross talk due to reflected lights from recording marks on adjacent tracks is a problem. In order to deal with this problem, there has been presented a technique of reducing cross talk by properly devising a structure of the recording medium and a depth of the groove.

Reproduction of recorded information is performed by detecting a change of intensity of reflected light beams from the optical disk as in conventional ones. However, this has the problem of crosstalk caused by the reflection of light from the recording mark on an adjacent track because of a narrow track pit. For the problem of a crosstalk, crosstalk reduction technique by improving a structure of the recording medium and a depth of the groove is proposed.

Tracking control is essential to recording/reproducing of information in the optical disk. This tracking control is effected by detecting a tracking error signal indicating a shift in a position of light beams irradiated on the optical disk from a track center in a track width direction thereof from reflected light beams from the optical disk and by controlling an irradiation position of the light beams irradiated on the optical disk by using this tracking error signal to the track center. Conventionally, as a method of detecting tracking errors, a push-pull method has often been used. In the push-pull method, imbalance, in intensity of diffracted light reflected from the optical disk and occurred by the groove or the like and produced due to a shift in the position of the light beams irradiated on the optical disk from the track center, is detected by obtaining a difference between two output signals from the 2-divided photodetector receiving the reflection light beams from the optical disk.

In the case of the land and groove recording system, however, since a considerable amount of light diffracted by the recording marks on the adjacent tracks leaks to the reflected light beams, an offset may be produced by the recording marks on the adjacent tracks if detection of tracking errors is performed by means of the push-pull method. Thus, influence exerted on the tracking error signal by the recording marks on the adjacent tracks increases by an amount equivalent to narrowing of the track pitches relative to conventional ones. Production of an offset in the tracking error signal due to the light diffracted by the recording marks on the adjacent tracks occurs when the recording marks exist only on the adjacent tracks in one side of tracks during recording/reproducing. The reason is why the light diffracted by the recording marks on only one side of the adjacent tracks enters the reflected light beams from the optical disk. Optimization of the structure of the recording medium and the depth of the groove, mentioned above, may be effective for reducing crosstalk due to the recording marks on the adjacent tracks during reproducing of information. But it will not be effective at all for reducing an offset during detecting of tracking errors.

Apparent from the foregoing, when track pitches are narrow as in the case of the land and groove recording system, an offset is produced in a tracking error signal because of light diffracted by recording marks on adjacent tracks and thus it is difficult to effect tracking control with respect to remaining errors permitted by the system.

SUMMARY OF THE INVENTION

It is an object of the invention to provide an optical information recording/reproducing apparatus capable of performing accurate tracking by reducing an offset in a tracking error signal produced due to light diffracted by recording marks on adjacent tracks even when track pitches are narrow.

According to a first aspect of the invention, an optical information recording/reproducing apparatus is provided for optically recording/reproducing information by irradiating lights on tracks on a recording medium. The apparatus is provided with detecting means for selectively detecting an area smaller than a beam cross-section of a light beam reflected by the recording medium and obtaining an output signal corresponding to the area; tracking error signal producing means for producing, from the output signal of the detecting means, a tracking error signal indicating a shift in a position of a light beam irradiated on the recording medium in a track width direction; and tracking control means for controlling an irradiation position of a light beam irradiated on the recording medium in the track width direction based on the tracking error signal. The area smaller than the reflected area is a circular area.

A preferred embodiment of the apparatus is as follows:

(1) The circular area smaller than the beam cross-section of the light beam reflected by the recording medium is a circular area larger having a diameter that is 0.2 to 1.0 times the beam diameter of the light beam reflected by the recording medium.

(2) When a value of a relational expression among a track pitch Tp on the recording medium, a wavelength A of a light beam for recording/reproducing information on the recording medium and NA of an objective lens for condensing the light beam in a very small beam spot on the recording medium is Tp/λ×NA=0.66, the detecting means selectively detects a circular area having a diameter that is 0.23 to 0.86 times a beam diameter of the reflected light beam reflected by the recording medium and obtains an output signal corresponding to the area.

(3) When a track pitch on the recording medium is 0.75 μm or 0.74 μm, the detecting means selectively detects a circular area having a diameter that is 0.4 to 0.8 times a beam diameter of the light beam reflected by the recording medium and obtains an output signal corresponding to the area.

(4) When a track pitch on the recording medium is 0.7 μm, the detecting means selectively detects a circular area having a diameter that is 0.23 to 0.6 times a beam diameter of the light beam reflected by the recording medium and obtains an output signal corresponding to the area.

(5) the area smaller than the reflected area is an area which is symmetrical with respect to the center axis with a bisector in parallel with a track tangential direction of a photodetector as a center axis and has widths ⅓ or less of a diameter of the reflected beam. Two limited areas in the vicinity of the center of the photodetector are each used as an area having widths ⅓ or less of a diameter of the reflected beam, and the tracking error signal is produced in such a manner that with detected signals by the two areas as A and B respectively, A−B or (A−B)/(A+B) is calculated.

As the two areas, two leaf-shaped areas respectively having widths ⅓ or less of a diameter of the beam spot irradiated on the photodetector in the track radial direction are used.

(6) The recording medium is structured by alternately disposing areas different in height, and information is recorded in the areas as tracks.

An area, e.g., a circular area, having a diameter that is 0.2 to 1.0 times a beam diameter, of the light beam reflected by the recording medium can be a tracking error detection area, and the tracking error can be detected by receiving the reflected light beams from the area by the 2-divisional detector and using the difference of the outputs. In this case, an offset in the tracking error signal caused by the light diffracted by the recording marks on the adjacent tracks is set off when a tracking error signal is produced, making it possible to effectively reduce an offset.

Furthermore, according to the invention, for the tracking error detection area, two areas in the vicinity of the center and symmetrical in the divisional line of the photodetector divid a line parallel to a track direction. This makes it possible to reduce an offset more compared with the case where a difference in output between a right and a left half of the photodetector of conventional push-pull method is used for a tracking error signal and to performs stable tracking control. Therefore, since in the land and groove recording system, as an area for producing a tracking error signal on the photodetector, the areas in the vicinity of the center thereof and symmetrical in the disk radial direction are specified, it is possible to reduce a track offset produced when a mark is recorded only in either one of the tracks adjacent to a target track, improving track follow-up performance.

As described above, according to the first aspect of the invention, tracking errors are detected by using a circular area with a diameter, for instance between 0.23 to 0.8 times a diameter of the light beams reflected by the recording medium or by setting two areas in each area of both sides as tracking area detecting areas, in which the reflected light beams are divided by the line parallel to the track direction extending from the center of the reflected light beams, with a position away from the beam center of the reflected light beams by 0.18 to 0.5 times a beam diameter thereof as a center and not in contact with the center of the reflected light beams or an outer end thereof. Therefore, even when track pitches are narrow as in the case of the land and groove recording system, an offset produced in a tracking error signal because of light diffracted by the recording marks on the adjacent tracks can be effectively reduced and tracking can be accurately performed.

According to a second aspect of the invention, an optical information recording/reproducing apparatus is provided for optically recording/reproducing information by irradiating light beams on tracks on recording medium. The apparatus is provided with detecting means for selectively detecting two areas with a position away by 0.18 to 0.5 more than a beam diameter in both sides of a track width direction from a beam center of a light beam reflected by the recording medium as a center and not in contact with the beam center or an outer end of the reflected light beam and obtaining an output signal corresponding to the areas; tracking error signal producing means for producing, from the output signal of this detecting means, a tracking error signal indicating a shift in a position of the light beam irradiated on the recording medium in a track width direction; and tracking control means for controlling an irradiation position of the light beam irradiated on the recording medium based on the tracking error signal.

A preferred embodiment of the apparatus is as follows:

(1) When a track pitch on the recording medium is 0.75 μm, the detecting means selectively detects two areas with a position away by 0.18 to 0.5 more than a beam diameter in both sides of the track width direction from a beam center of the reflected light beam reflected by the recording medium as a center and not in contact with the center or an outer end of the reflected light beam and obtains an output signal corresponding to the areas.

(2) When a track pitch on the recording medium is 0.74 μm, the detecting means selectively detects two areas with a position away by 0.18 to 0.45 more than a beam diameter in both sides of the track width direction from the beam center of the reflected light beam reflected by the recording medium as a center and not in contact with the center or an outer end of the reflected light beam and obtains an output signal corresponding to the areas.

(3) When a track pitch on the recording medium is 0.7 μm, the detecting means selectively detects two areas with a position away by 0.18 to 0.4 more than a beam diameter in both sides of the track width direction from the beam center of the reflected light beam reflected by the recording medium as a center and not in contact with the center or an outer end of the reflected light beam and obtains an output signal corresponding to the areas.

(4) The recording medium is structured by alternately disposing areas different in height and information is recorded in the areas as tracks.

As described above, the tracking error is detected by setting two areas in each area of both sides, in which the reflected light beams are 2-divided by the line parallel to the track direction extending the center of the reflection light beams, with a position away from the beam center of the reflected light beams by 0.18 to 0.5 more than a beam diameter thereof as a center and not in contact with the center of the reflected light beams or an outer end thereof, as a tracking error detection areas. An offset in the tracking error signal caused by the diffraction lights by the recording marks on the adjacent tracks is set off when a tracking error signal is produced, making it possible to effectively reduce an offset.

Therefore, according to the second aspect of the invention, the tracking error detection is, as in the case of the land and groove recording system, effective in particular when track pitches are very narrow. More specifically, since an offset in the tracking error signal attributed to the light diffracted lights by the recording marks on the adjacent tracks is effectively reduced, it is possible to perform recording/reproducing of information in narrower track pitches, consequently increasing a recording density.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 3 is a view showing structures of a first photodetector and a focus error detecting circuit in an arithmetic circuit in the first embodiment;

FIG. 4 is a view showing a structure of a mask in the first embodiment;

FIG. 5 is a view showing a structure of an optical disk in the first embodiment;

FIG. 8 is a view illustrating effects of offset reduction;

FIG. 10 is a view illustrating effects of offset reduction;

FIGS. 12A and 12B are views showing a distribution of intensity of diffraction lights by irradiating light beams centering on a target track when recording has been made only in one of adjacent tracks;

FIG. 13 is a view showing a tracking error signal when a tracking error detecting means is used;

FIG. 14 is a plan view showing an example of a tracking error producing area of the photodetector;

DETAILED DESCRIPTION OF THE PREFERRED EMBODIMENTS

Now, the preferred embodiments of the invention will be described with reference to the accompanying drawings.

(First Embodiment)

Figure 1:
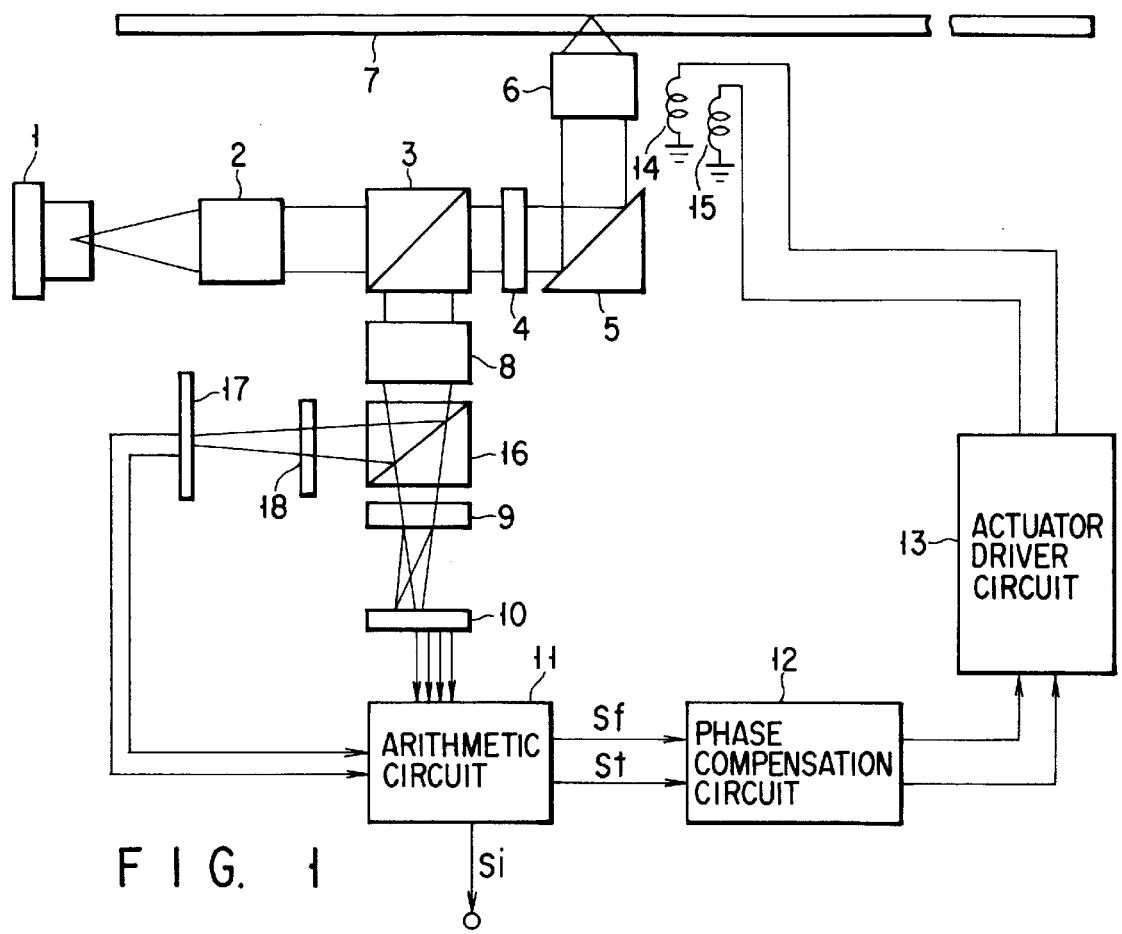
FIG. 1 is a view showing a structure of an optical information recording/reproducing apparatus of a first embodiment of the invention.

FIG. 1 is a view showing a structure of an optical disk apparatus as an optical information recording/reproducing apparatus of the first embodiment. In FIG. 1, a light beam emitted from a laser light source 1 is converted into a parallel light beam, then transmitted through a first beam splitter 3, condensed by an objective lens 6 after passing through a quarter wavelength plate 4 and a mirror 5 and irradiated on an optical disk 7 as a very small spot having a spot diameter of 1 $\mu$m.

A reflected light beam reflected by the optical disk 7 is, in contrast with the irradiation light beam, reflected by the first beam splitter 3 after passing through the objective lens 6, the mirror 5 and the quarter wavelength plate 4, condensed by a convex lens 8, then divided into two by means of a second beam splitter 16 and guided to a focus error detection system and a tracking error detection system.

In the focus error detection system, a reflected light beam from the optical disk 7 made incident from the second beam splitter 16 is passed through a holographic optical element (hereinafter called HOE) 9 having a function of detecting focus errors and then a diffraction light by the HOE 9 is detected by means of a first photodetector 10 having a divided photodetection surface. An output signal from this first photodetector 10 is input to an arithmetic circuit 11 and a focus error signal Sf is produced by means of calculation.

In the tracking error detection system, a reflected light beam made incident from the second beam splitter 16 is passed through an aperture of a mask 18 and then detected by means of a second photodetector 17 having a 2-divided photodetection surface. An output signal from this second photodetector 17 is input to the arithmetic circuit 11 and a tracking error signal St is produced by means of calculation.

In the arithmetic circuit 11, an information reproducing signal Si is produced by adding signals obtained from the tracking error detection system or the focus error detection system. This information reproducing signal Si is sent to a signal processing part, not shown.

The focus error signal Sf and the tracking error signal St produced in the arithmetic circuit 11 are input to an actuator driver circuit 13 via a phase compensation circuit 12. The actuator driver circuit 13 flows current to a focus actuator coil 14 and a tracking actuator coil 15 based on a focus error signal and a tracking error signal after phase compensation. The objective lens 6 is moved by a force generated by the current flowing the focus actuator coil 14 and the tracking actuator coil 15 in focus and tracking directions so as to effect focus control and tracking control.

Next, structures of the major parts shown in FIG. 1 will be described in detail.

Figure 2:
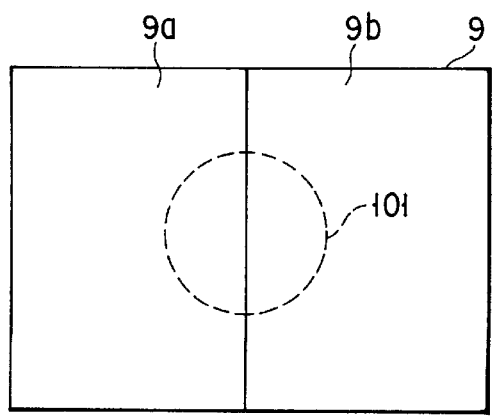
FIG. 2 is a view showing a structure of a holographic optical element in the first embodiment.

FIG. 2 is a view showing a structure of the HOE 9. This HOE 9 is provided with two divided areas 9a and 9b in a track width direction on the optical disk 7, and as shown by a broken line, a reflected light beam 101 from the optical disk 7 is made incident on both areas 9a and 9b. The reflected light beam 101 is a reflected light beam after passing through the objective lens 6 and processing thereafter is the same as in the above-described case.

FIG. 3 is a view showing structures of the first photodetector 10 and a focus error detection circuit in the arithmetic circuit 11. The photodetector 10 is a 4-divided photodetector having four areas 10a, 10b, 10c and 10d in which a photodetection surface is divided in directions equivalent to a track direction and the track width direction on the optical disk 7. A differential amplifier 11a in the arithmetic circuit 11 obtains a difference in output signals between the areas positioned in diagonal directions and thereby the focus error signal Sf is produced.

Here, in order to detect the focus error signal Sf as described above, the areas 9a and 9b of the HOE 9 shown in FIG. 2 have groove patterns so as to enable the light beam to change in form on the areas 10a, 10b, 10c and 10d of the photodetector 10 shown in FIG. 3 following a change in a space between the objective lens 6 and the optical disk 7. For example, when the optical disk 7 is in a focus position of the objective lens 6, a form of the optical beam on the areas 10a, 10b, 10c and 10d of the photodetector 10 shown in FIG. 3 becomes one like that indicated by a broken line in the drawing. In this way, the focus error signal Sf can be obtained from the differential amplifier 11a shown in FIG. 3.

FIG. 4 is a view showing a structure of the mask 18 provided in the tracking error detection optical system. The mask 18 having a circular aperture 19 shields an external light of the reflected light beam 101, allows only light beams within the aperture 19. Therefore, the reflected light beams only a portion in a circular area having a size larger by 0.4 to 0.8 than a beam diameter of the reflected light beams 101, described later, passes through the aperture 19 and is incident on the second photodetector 17. Only the light beam in the circular area (tracking error detection area) of the reflected light beams are detected by the second photodetector 17 and the tracking error signal St is produced.

Next, the optical disk 7 will be described in detail with reference to FIG. 5.

The optical disk 7 in the embodiment is an optical disk of the above-described land and groove recording system. In the optical disk 7, an information signal can be recorded on a groove 72 for performing tracking control and a land 71 between the grooves 72 as a recording mark by a phase change or a magneto-optical pattern. Thus, tracks, which an information is recorded, exist in both of the land 71 and the groove 72. In the optical disk of the land and groove recording system, an amount of crosstalk of a reproduced information signal can be reduced by making a depth of the groove 72 and a structure of a recording medium optimal. On the other hand, it is not so effective in optimization of the structure of the recording medium and the depth of the groove 72 in terms of tracking error detection and thus an offset is produced in a tracking error signal during detecting of tracking errors by means of the conventional push-pull method and the amount of this offset increases as track pitches becomes narrow.

In the case of tracks shown in FIG. 5, since no recording marks exist in any of both tracks adjacent to a track Ta during recording/reproducing thereof, no offset is produced in the tracking error signal. During recording/reproducing of a track Tb, however, since the recording mark 73 exists only in one of the adjacent tracks and effects of diffraction lights by the recording marks on the adjacent tracks are imbalanced, an offset is produced in the tracking error signal detected by means of the push-pull method.

Figure 6:
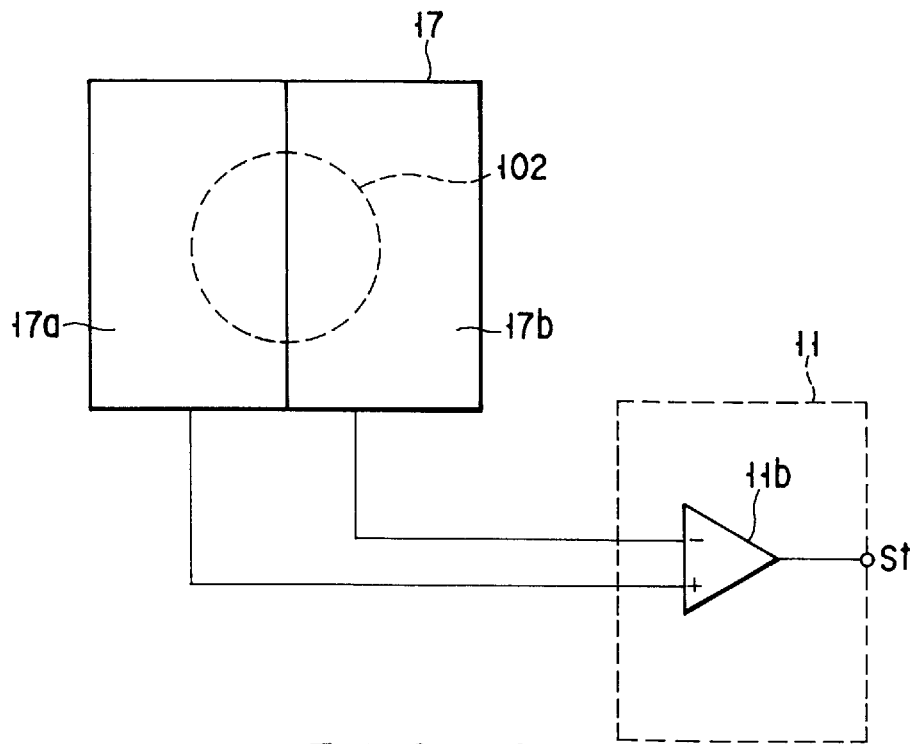
FIG. 6 is a view showing structures of a second photodetector and a tracking error detecting circuit in the arithmetic circuit in the first embodiment.

The push-pull method is, as shown in FIG. 6, the second two-divided photodetector 17 having two detection areas 17a and 17b obtained by divided into two along a direction equivalent to tangential direction (track direction) of the optical disk 7 detects a reflected light beam 102 from the optical disk 7 and a tracking error signal St is produced by obtaining a difference in output signals between the detection areas 17a and 17b by means of the differential amplifier 11b in the arithmetic circuit 11.

Therefore, when track pitches are narrow, the quantity of diffraction lights by the recording marks on the adjacent tracks leaking to the reflected light beams 101 from the optical disk 7 increases. For this reason, in particular during reproducing of the track Tb shown in FIG. 5, in which effects of the diffraction lights by the recording marks on the adjacent tracks are imbalanced in the radial direction of the optical disk, a big offset is produced in the tracking signal St. In order to reduce production of such an offset in the tracking error signal, in the embodiment, only a portion in a specified circular area of the reflected light beam 101 from the optical disk 7 is selected by using the mask 18 having the aperture 19 shown in FIG. 4, only a reflected light beam 102 of a circular area passed through the aperture 19 of the mask 18 is made incident on the second photodetector 17 as shown in FIG. 6 and thereby the tracking error signal St is produced.

Here, by properly setting a size of the aperture 19 of the mask 18 (diameter of the reflected light beam 102), that is, a diameter of the tracking error detection area, the offset in the tracking error signal can be effectively reduced. A method of setting the size of the aperture 19 of the mask will be described hereinbelow.

Figure 7:
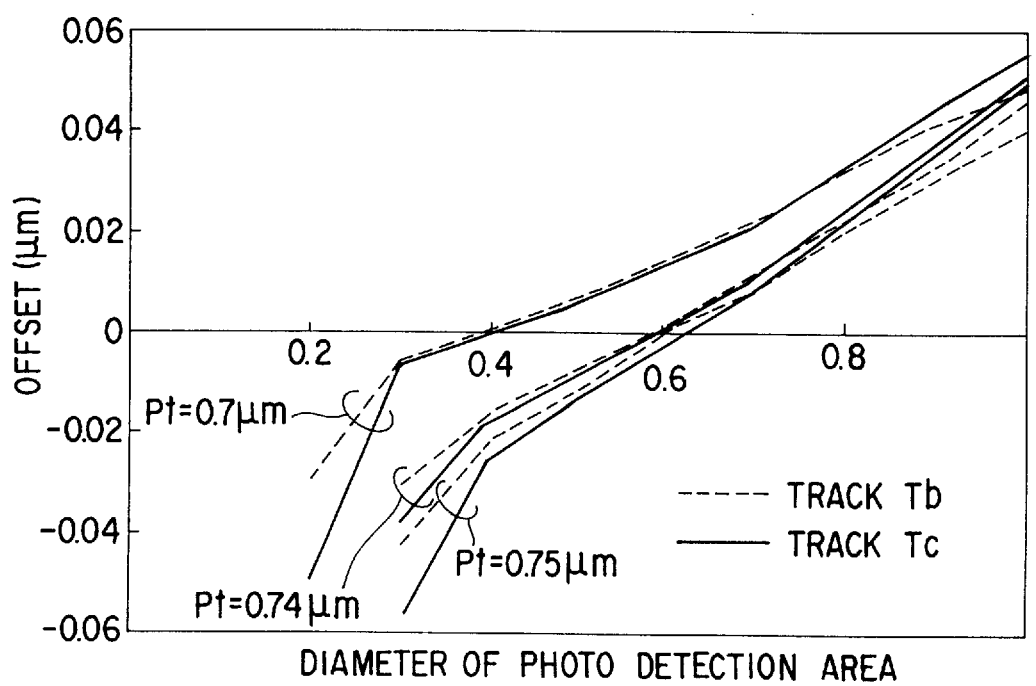
FIG. 7 is a view showing a relationship between a diameter of an area for detecting tracking errors and an offset in the tracking error signal in the first embodiment.

FIG. 7 shows a result of calculating a relationship between the tracking error detection area and the offset in the tracking error signal. As a condition for calculation, a wavelength of the laser light source 1 is set to 680 nm and NA of the objective lens 6 is set to 0.6. In this case, a light beam diameter is about 0.96 μm. A tracking error detection area diameter on an abscissa is a value obtained by standardizing a diameter of the aperture 19 with a beam diameter of the reflected light beam 101 made incident on the mask 18. Broken and solid lines indicate the tracks Tb and Tc shown during reproducing shown in FIG. 5.

FIG. 8 shows a calculating result of a relationship between the tracking error signal detection area diameter and the offset in the tracking error signal. As a condition for calculation, a wavelength λ of the laser light source 1 is set to 532 nm and NA of the objective lens 6 is set to 0.6. In this case, a light beam diameter is about 0.75 μm. A tracking error signal detection area diameter on an abscissa is a value obtained by standardizing a diameter of the aperture 19 with a beam diameter of the light beam 101 made incident on the mask 18. Broken and solid lines indicate the tracks b and c during reproducing shown in FIG. 5.

It is clear from these calculation results that by detecting tracking errors using the light beam in the specified area of the reflected light beam 101 it is possible to reduce or even make almost zero the tracking error offset caused by the diffraction lights by the recording marks on the adjacent tracks in the optical disk in which track pitches are narrow like that in the land and groove recording system.

More specifically, as shown in FIG. 7, when a track pitch is Pt=0.75 μm or 0.74 μm, by detecting the light beam 102 of a circular area having a size larger by about 0.6 than the beam diameter of the reflected light beam 101 from the center thereof, the offset in the tracking error signal can be reduced to almost zero. Also, when a track pitch is Pt=0.7 μm, by detecting the light beam of a circular area having a size larger by about 0.4 than the beam diameter of the reflected light beam 101, the offset in the tracking error signal can be reduced to almost zero.

As shown in FIG. 8, when a track pitch Pt=0.587 μm, by detecting the light beam 102 of a circular area having a size larger by about 0.6 than the beam diameter of the reflected light beam 101 from the center thereof, the offset in the tracking error signal can be reduced to almost to zero.

In FIGS. 7 and 8, when the tracking error signal is to be detected by means of the conventional push-pull method, a diameter of the photodetection area is 1. Thus, in order to reduce the tracking offset attributed to the adjacent marks by using the push-pull method, under Pt=0.75 μm or Pt=0.74 μm, a diameter of the reflected light beam 102 after passing through the aperture 19 of the mask 18 must be set larger by about 0.37 and smaller by 1.0 than the diameter of the reflected light beam 101 before passing through the aperture 19. Under Pt=0.7 μm, a diameter of the reflected light beam 102 after passing through the aperture 19 of the mask 18 must be set larger by about 0.2 and smaller by 1.0 than the diameter of the reflected light beam 101 before passing through the aperture 19. Under Pt=0.587 μm shown in FIG. 8, a diameter of the reflected light beam 102 after passing through the aperture 19 of the mask 18 must be set larger by about 0.33 and smaller by 1.0 than the diameter of the reflected light beam 101 before passing through the aperture 19.

Usually, under Pt=0.75 μm or Pt=0.74 μm, a offset in the tracking error signal amount permitted for the tracking error signal detection optical system is about 0.02 μm. Thus, as long as a diameter of the reflected light beam 102 after passing through the aperture 19 of the mask 18 is within a size larger by about 0.4 to 0.8 than the diameter of the reflected light beam 101 before passing through the aperture 19, a condition as the optical disk apparatus can be satisfied.

Under Pt=0.7 μm, an offset in the tracking error signal amount permitted for the tracking error signal detection optical system is about 0.019 μm. Thus, a diameter of the reflected light beam 102 after passing through the aperture 19 of the mask 18 must be set larger by about 0.25 to 0.65 than the diameter of the reflected light beam 101 before passing through the aperture 19.

Under Pt=0.587 μm shown in FIG. 8, a tracking error signal detection optical system permitted for the tracking error signal detection optical system is made small by an amount equivalent to narrowing of the track pitch and about 0.016 μm. Thus, a diameter of the reflected light beam 102 after passing through the aperture 19 of the mask 18 must be set larger by about 0.38 to 0.86 than the diameter of the reflected light beam 101 before passing through the aperture 19.

Therefore, it is clear that when a value of the track pitch Pt is within the range from 0.7 μm to 0.75 μm usually employed for the optical disk of the land and groove recording system, by setting a diameter of the reflected light beam to a size larger by 0.23 to 0.8 than the diameter of the reflected light beam 101 before passing through the aperture 19, the offset in the tracking error signal can be effectively reduced.

Under Tp=0.75 μm, λ=680 nm and NA=0.6 in FIG. 7, a relationship is set at Tp/λ×NA=0.66. Under Tp=0.587 μm, λ=532 μm and NA=0.6 in FIG. 8, a relationship is set at Tp/λ×NA=0.66. In both FIGS. 7 and 8, a diameter of the reflected light beam 102 is larger by about 0.6 than the diameter of the reflected light beam 101 and an offset in the tracking error signal is reduced to almost zero. Also, the permitted ranges are nearly equal. Thus, an area in which an offset in the tracking error signal can be reduced can be determined depending on a value obtained by means of a relational expression among a track pitch, a wavelength of the laser light source 1 and NA of the objective lens 6. In this case, when Tp/λ×NA is about 0.66, a diameter of the reflected light beam 102 after passing through the aperture 19 of the mask 18 is larger by about 0.4 to 0.8 than the diameter of the reflected light beam 101 before passing through the aperture 19.

Under Tp=0.7 μm, λ=680 nm and NA=0.6, a relationship is set at Tp/λ×NA=0.62.

Next, explanation will be made of a principle of reducing an offset in the tracking error signal by referring to FIGS. 9 and 10.

Figure 9:
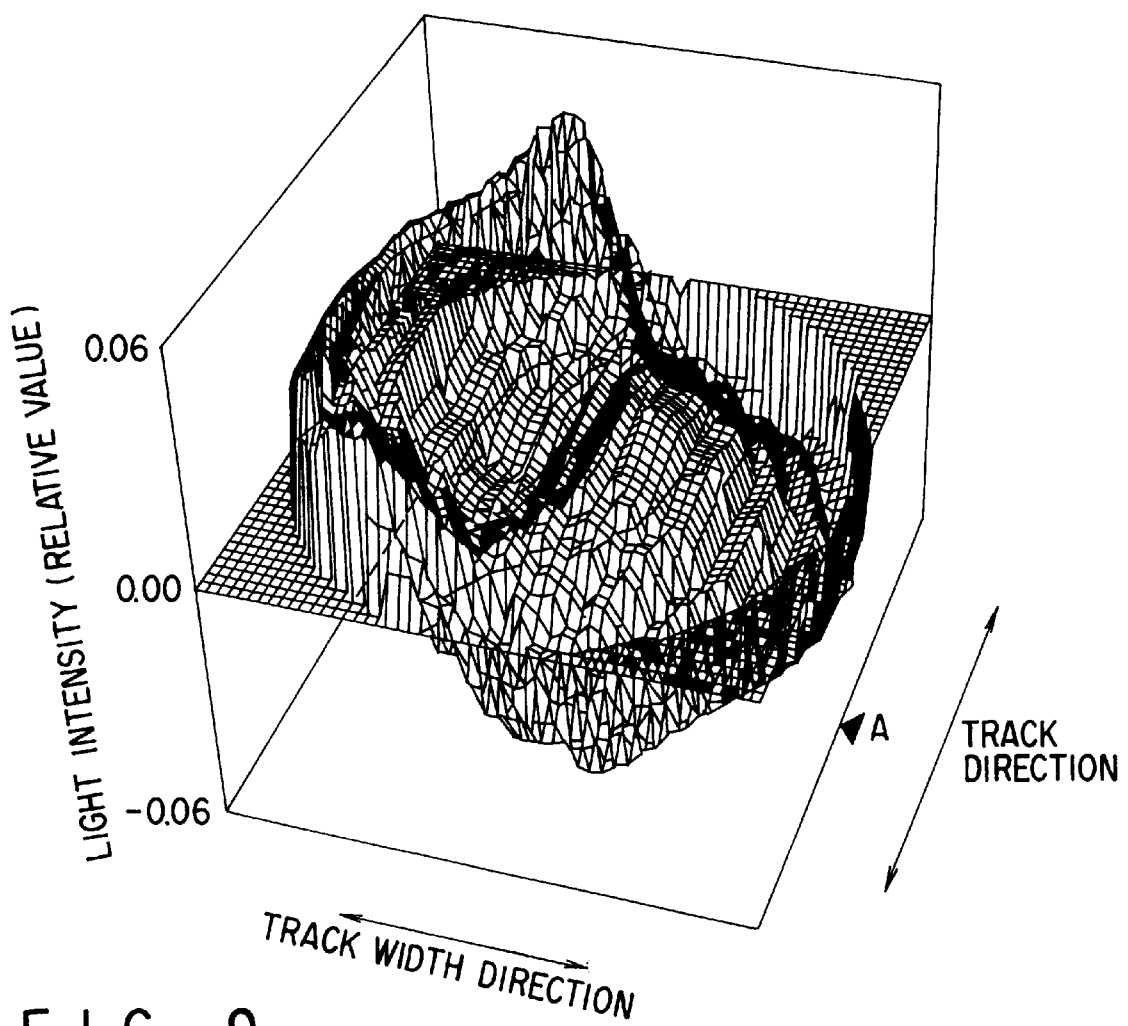
FIG. 9 is a view illustrating effects of offset reduction.

FIG. 9 is a bird's-eye view showing relative intensity among only diffraction lights of adjacent marks affecting the reflective light beam excluding those of tracks, marks and grooves during reproducing when marks exist only in a track adjacent to the track during reproducing. When the marks exist in the adjacent track, the reflected light beam 101 is changed in intensity because of the adjacent marks like that shown in FIG. 9.

In order to simplify explanation, FIG. 10 shows an intensity distribution of a cross section in a track width direction on an A point in FIG. 9, that is, a cross section cut in the track width direction by a line passing through a center of the reflected light beam 101. An abscissa in the drawing shows a radial position of the light beam and effects of the diffraction lights of the adjacent marks are different from one another depending on the radial positions. An absolute value the light amount of plus side of outside of left area in FIG. 10 is larger than that of minus side of the outside of right area and, on the contrary, in inside area, right area is slightly larger. On the contrary, in inner and outer side areas, when the adjacent marks exist in a side opposite to that in the case shown in FIG. 9, intensity distributions of the diffraction lights by the adjacent marks are symmetrical to each other with a center line in the track direction.

Here, when tracking errors are to be detected by means of the push-pull method, as shown in FIG. 6, a difference in light intensity between the two areas divided by the center line in the track direction of the reflected light beam is detected by using the second photodetector 17. In FIG. 10, since the intensity distributions of the diffraction lights of the adjacent marks are symmetrical to each other in right and left sides with the center as a border, an offset is produced in the tracking error signal if the conventional push-pull method is used.

This is also clear from the calculation result shown in FIG. 7. More specifically, as shown in FIG. 7, a tracing error signal offset is larger in a plus direction when the tracking error signal detection area is large, while this is smaller as the tracking error detection area diameter is decreased. However, when a diameter of the tracking error signal detection area is made smaller than a certain level (0.6 or less under Tp=0.75 μm, 0.4 or less under Tp=0.7 μm), an offset in the tracking error signal is increased in a minus direction, reversibly to the case where the diameter of the tracking error signal detection area is large. Such an increase in the offset in the tracking error signal in the minus direction occurs, because of the fact that when the diameter of the tracking error detection area is made small, effects of imbalance in the outer side area shown in FIG. 9 or FIG. 10 are made small and effects of the inner side area are relatively made dominant.

Therefore, if a diameter of the aperture 19, that is, a diameter of the reflected light beam 102 after passing through the aperture 19 of the mask 18 is selected so as to obtain balance in the reflected light beam 101 between the outer and inner sides, offset components of the tracking error signal generated in the reflected light beam 102 are made equal, reducing the offset in the tracking error signal to zero.

FIG. 7 shows a result of calculating a diameter of the tracking error detection area (ratio of a diameter of the reflected light beam 102 after passing through the aperture 19 to that of the reflected light beam 101 before passing the aperture 19) in which a condition of reducing an offset in the tracking error signal is satisfied based on such a principle and this ratios ranges, as described above, from 0.23 to 0.8.

Figure 11:
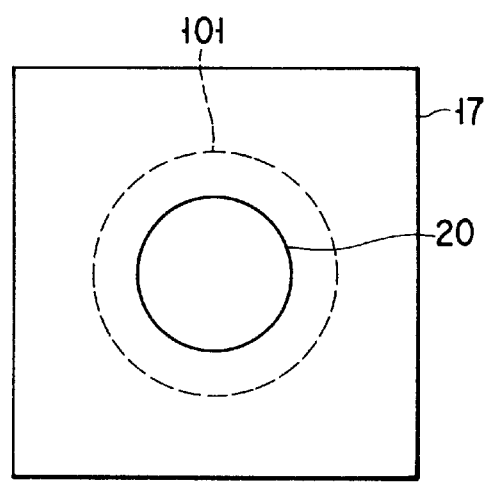
FIG. 11 is a view showing a structure of a photodetector limiting a tracking error detection area.

A position for placing the mask 18 may be selected in any part of the optical system shown in FIG. 1, as long as only the specified area, mentioned above, on the reflected light beam 101 from the optical disk 7 can be selectively detected by means of the second photodetector 17. Instead of selectively obtaining the above-described circular area from the reflected light beam 101 by using the mask 18, a photodetection surface 20 of the photodetector 17 may be formed, as shown in FIG. 11, so as to detect only the circular area therefrom.

A modified example of the first embodiment will be described. Since a structure of an apparatus is almost the same as in the first embodiment, drawings and explanation will be omitted.

In the modified example of the first embodiment, when tracking errors are to be detected, a light beam is input by means of a mask 8 to a photodetector 17 having a photodetection area shown in FIG. 14 and the tracking errors thereby detected are corrected. Operations thereafter are the same as in the first embodiment.

FIG. 12A shows, in a case where recording has been made only in one of both adjacent tracks, diffraction light intensity distributions on the photodetector when the light beam is irradiated centering on a target track. In this analysis, it is assumed that under conditions of a light wavelength 690 nm, a numerical aperture of an objective lens 0.6 and a track pitch 0.6 μm, a sufficiently long mark having a width of 0.45 μm has been recorded.

FIG. 12B shows a push-pull signal of FIG. 12A. As shown in FIG. 12B, a tracking offset is occurred.

FIG. 13 shows a tracking error signal wave form when tracking error signal producing areas on the photodetector are limited to those hatched areas shown in FIG. 14. At this time, the photodetector is a square, a length of a side is equal to a diameter of a light beam spot and each of the two hatched areas has widths almost half of the beam spot diameter in the track direction and almost ⅕ of the beam spot diameter in the radial direction. In the drawing, an offset is reduced to almost ⅓. A tracking error signal is obtained, with detected signals from the two areas in the left and right sides of the photodetector as A and B respectively, by calculating (A−B)/(A+B) to increase a signal amplitude. The offset occurred is not changed even if a tracking error signal calculated by (A−B) is used. It is predetermined that as the above-described two areas, two leaf-shaped areas respectively having widths almost ⅓ or less of a diameter of the beam spot irradiated on the photodetector in the disk radial direction are used.

As described above, a circular area of center of the reflected beams shown in the first embodiment and a rectangular area shown in the modification thereof is shown as a method of reducing a tracking offset from a recording mark of adjacent tracks. Accordingly, an arbitrary shape of a tracking error detection area for reducing an offset may be selected if an imbalance of the diffraction light of the recording mark on the adjacent tracks included in the reflected light beams can be canceled. The tracking offset reduction effect does not change, even if a detected tracking error signal is normalized by the sum signal obtained by the same detector as a calculating method of the tracking error signal.

In the embodiment, the beam spot position is controlled by moving the objective lens. But there would be no change in effects of the invention even if the beam spot position may be controlled by disposing a galvanomirror in an optical path and rotating this.

(Second Embodiment)

Figure 15:
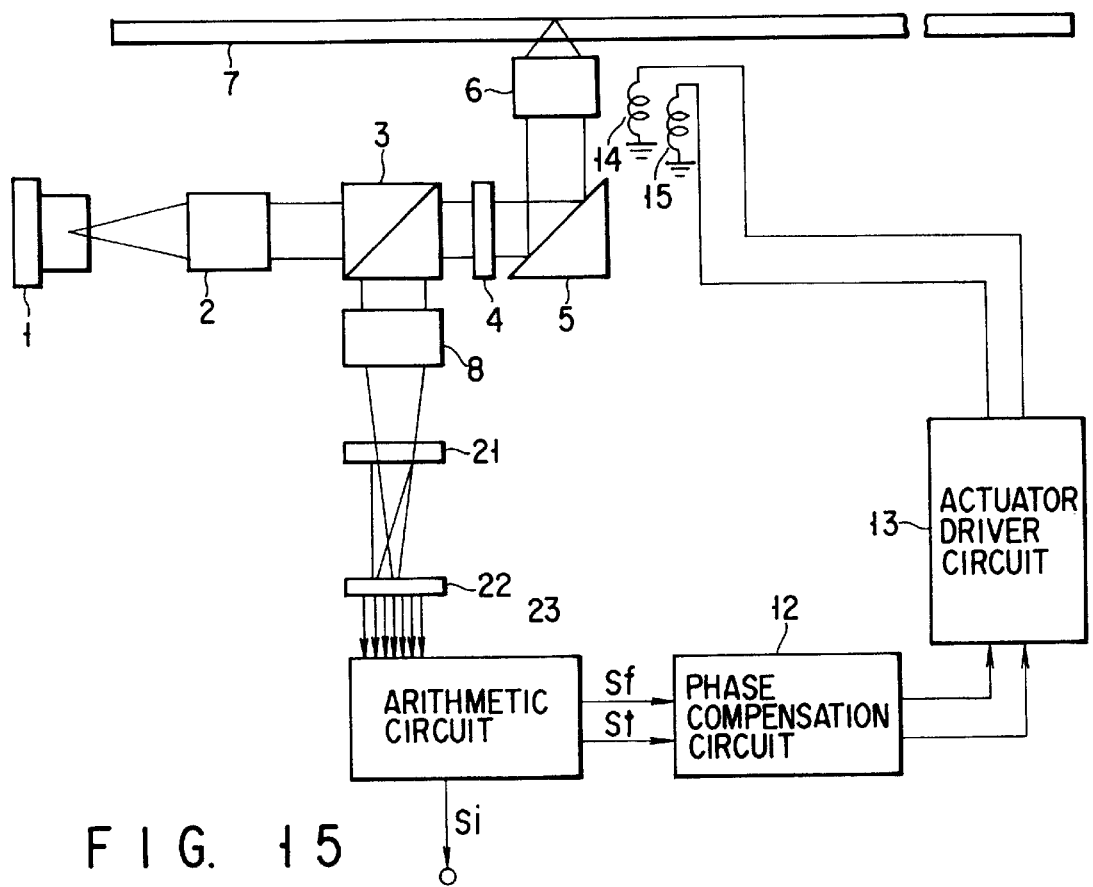
FIG. 15 is a view showing a structure of an optical information recording/reproducing apparatus of a second embodiment.

FIG. 15 is a view showing a structure of an optical disk apparatus as an optical information recording/reproducing apparatus of a second embodiment of the invention. In the drawing, after a light beam emitted from a laser light source 1 is converted into a parallel light beam by means of a collimator lens 2, this is condensed by means of an objective lens 6 after further passing through a quarter wavelength plate 4 and a mirror 5 and irradiated on an optical disk 7 as a very small spot having a diameter of about 1 μm.

A reflected light beam reflected by the optical disk 7 is reflected by means of a beam splitter 3 after passing, conversely to the irradiated light beam, through the objective lens 6, the mirror 5 and the quarter wavelength plate 4. This is condensed by means of a convex lens 8 and then transmitted through a HOE 21 having a light separating function and a function of detecting focus and tracking errors. The reflected light beam thus transmitted through the HOE 21 is made incident on a photodetector 22 having a divided photodetection surface and thereby diffraction lights by the HOE 21 are detected.

An output signal from the photodetector 22 is input to an arithmetic circuit 23 and by means of calculation an information reproducing signal Si, a focus error signal Sf and a tracking error signal St are produced. The information reproducing signal Si is supplied to a signal processing part, not shown. The focus error signal Sf and the tracking error signal St are supplied through a phase compensation circuit 12 to an actuator driver circuit 13. The actuator driver circuit 13 drives a focus actuator coil 14 and a tracking actuator coil 15 based on the focus error signal and the tracking error signal after phase compensation. The focus actuator coil 14 and the tracking actuator coil 15 move the objective lens 5 respectively in focus and tracking directions so as to perform focus and tracking control.

Figure 16:
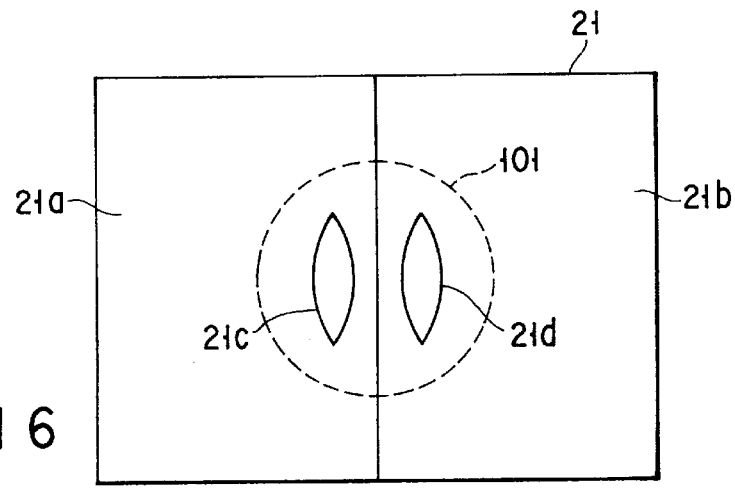
FIG. 16 is a view showing a holographic optical element in the second embodiment.

FIG. 16 is a view showing a structure of the HOE 21. In the embodiment, the HOE 21 is provided with a function of selecting a specified area of the reflected light beam 101 from the optical disk 7 as a tracking error detection area. This HOE 21 is further provided with 2-divided areas 21a and 21b in a direction equivalent to a track width direction on the optical disk 7 and leaf-shaped areas 21c and 21d as tracking error detection areas in both sides of a 2-dividing line in the areas 21a and 21b. The reflected light beam 101 from the optical disk 7 is made incident so that this exists in the areas 21a and 21b containing the tracking error detection areas 21c and 22d inside. The reflected light beam 101 is a reflected light beam after passing through the objective lens 6 and hereinafter this will be treated as such.

Now, the tracking error detection areas 21c and 21d will be described more in detail. Both areas 21c and 21d are positioned in both sides of the track width direction from a beam center of the reflected light beam 101. These are two areas placed with a position away by 0.5 to 0.26 more than a beam diameter of the reflected light beam 101 as a center and not in contact with a center or an outer end of the reflected light beam 101.

Figure 17:
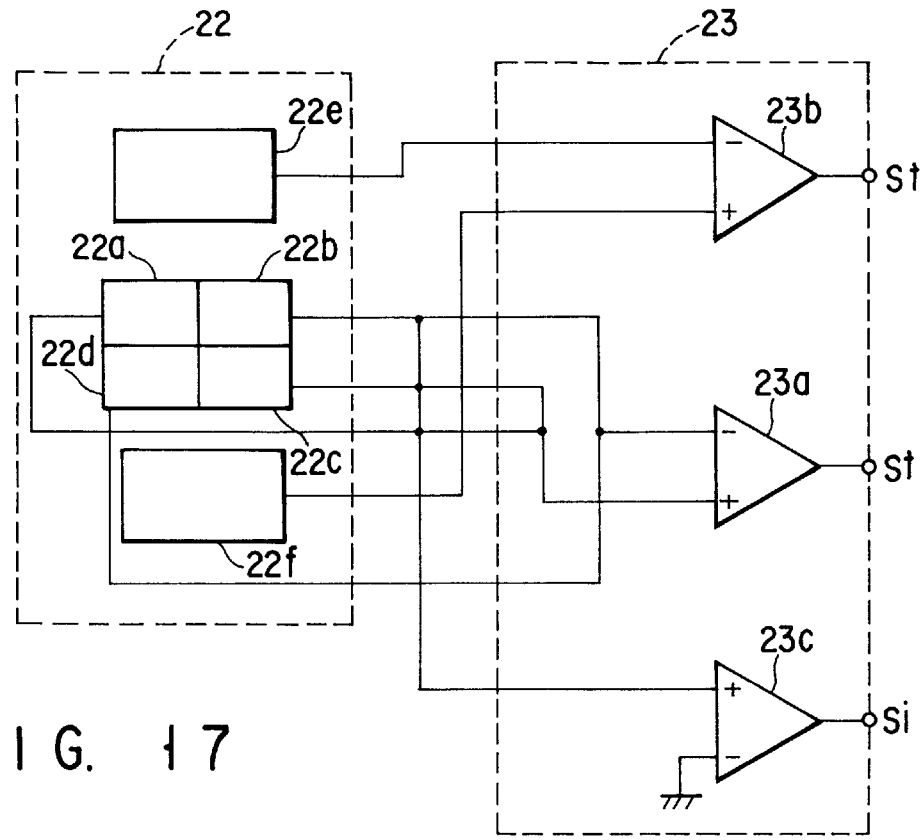
FIG. 17 is a view showing structures of a photodetector and an arithmetic circuit in the second embodiment.

FIG. 17 is a view showing structures of the photodetector 22 and the arithmetic circuit 23. The photodetector 22 is provided with a 4-divided photodetector having four areas 22a, 22b, 22c and 22d in which the photodetection surface is divided in a direction equivalent to the track and track width directions and two areas 22e and 22f disposed in outside of both sides of the 4-divided photodetector of a direction equivalent to the track direction of this 4-divided photodetector.

The arithmetic circuit 23 is composed of a first differential amplifier 23a for producing a focus error signal Sf by obtaining a difference in output signals from the areas positioned in a diagonal direction of the photodetector 22, a second differential amplifier 23d for producing a tracking error signal St by obtaining a difference in output signals from the areas 23e and 23f and a third differential amplifier 23c for producing an information reproducing signal Si by obtaining a sum total of output signals from the areas 22a, 22b, 22c and 22d. The information reproducing signal Si may be produced by obtaining a sum total of output signals from all the areas 22a to 22f of the photodetector 22.

Here, in order to detect the focus error signal Sf as described above, the areas 21a and 21b of the HOE 21 shown in FIG. 16 have groove patterns so that a form of the light beam changes on the areas 22a, 22b, 22c, and 22d of the photodetector 22 shown in FIG. 17 following a change in a space between the objective lens 6 and the optical disk 7. For instance, when the optical disk 7 is placed in a focus position of the objective lens 6, the light beam form on the areas 22a, 22b, 22c and 22d is like that indicated by a broken line in FIG. 17. In this way, a focus error signal Sf can be obtained from the differential amplifier 23a shown in FIG. 17.

The areas 21c and 21d of the HOE 21 shown in FIG. 16 have groove patterns so that light beams output from these areas 21c and 21d are condensed in the areas 22e and 22f of the photodetector 22 shown in FIG. 17. In this way, a tracking error signal St can be produced from output signals from the areas 22e and 22f of the photodetector 22 by means of the differential amplifier 23b shown in FIG. 17. That is, of the reflected light beam 101 reflected by the optical disk 7 and made incident on the HOE 21, from a portion having passed through the areas 21c and 21d (tracking error detection areas) of the HOE 21 a tracking error signal St is produced.

According to the second embodiment, it is possible to effectively reduce this offset in the tracking error signal by properly setting a center position of the tracking error detection areas 21c and 21d. Thus, explanation will next be made of a method of setting the center position of the tracking error detection areas 21c and 21d.

Figure 18:
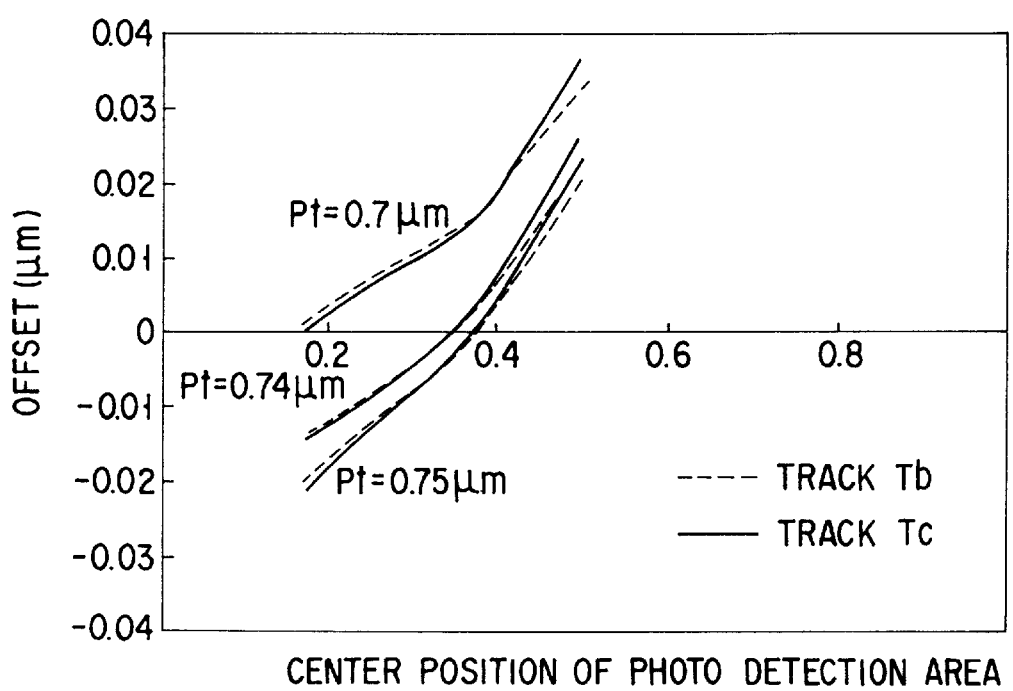
FIG. 18 is a view showing a relationship between a center position of two tracking error detection areas and an offset in the tracking error signal in the second embodiment.

FIG. 18 shows a result of calculating a relationship between the center position of the tracking error detection areas 21c and 21d and an offset in the tracking error signal. As a condition for calculation, a track pitch is set to Pt=0.75 μm, a wavelength of the laser light source 1 is set to 680 nm and NA of the objective lens 6 is set to 0.6. A tracking error detection area center position on an abscissa is a position in the radial direction of the reflected light beam 101 from the optical disk 7 and a radius of the reflected light beam is 1. Broken and solid lines indicate the tracks Tb and Tc during reproducing shown in FIG. 5.

Figure 19:
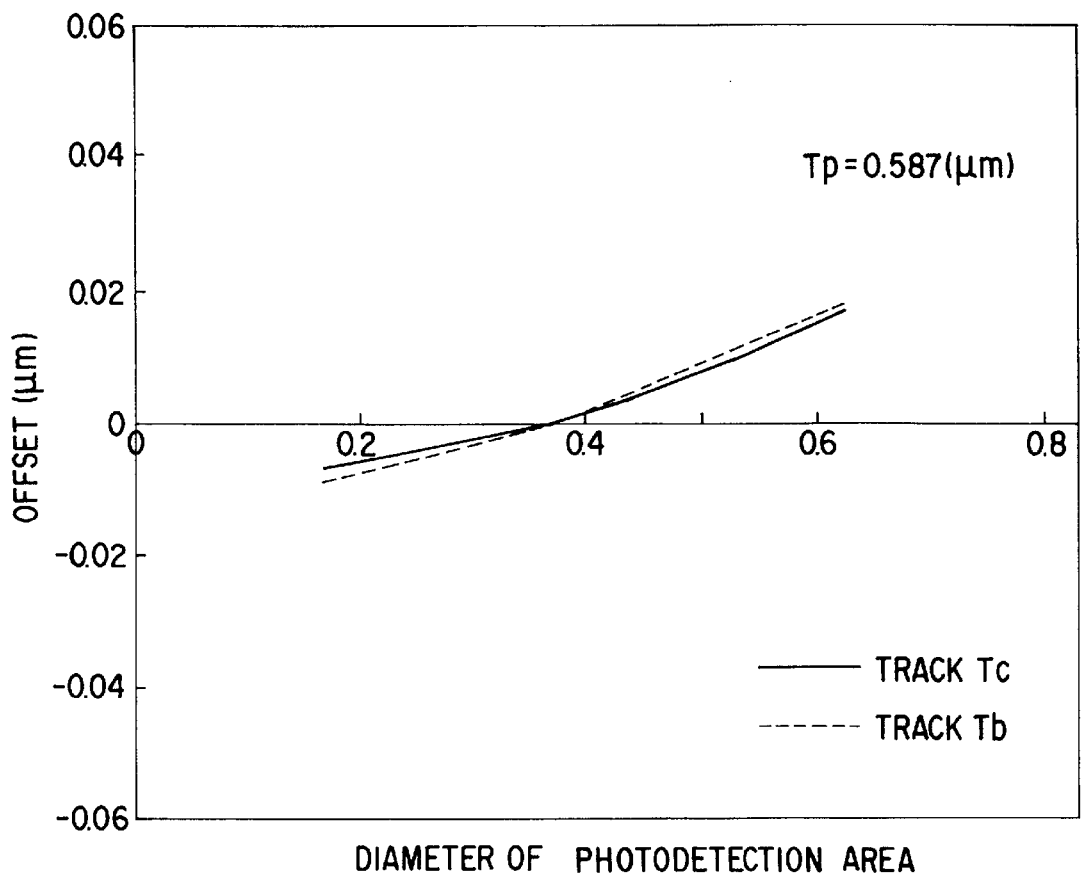
FIG. 19 is a view showing a calculating result of a relationship between a center of a tracking error detection area and an offset in the tracking error signal.

Also, FIG. 19 shows a result of calculating a relationship between the center position of the tracking error detection areas 21c and 21d and an offset in the tracking error signal. As a condition for calculation, a wavelength A of the laser light source is set to 532 nm and NA of the objective lens is set to 0.6. In this case, a light beam diameter is about 0.75 μm. A tracking error detection area center position on an abscissa is a position in the radial direction of the reflected light beam 101 from the optical disk 7 and a radius of the reflected beam light 101 is 1. Broken and solid lines indicate the tracks Tb and Tc during reproducing shown in FIG. 19.

It is clear from this result of calculation that by selecting the tracking error detection areas 21c and 21d with the center position properly set from the reflected light beam 101, guiding these to the areas 22e and 22f of the optical disk 22 shown in FIG. 17 and detecting tracking errors, it is possible to reduce or make almost zero a tracking error offset attributed to the diffraction lights by the recording marks on the adjacent tracks in the optical disk having a narrow track pitch like that in the optical disk of the land and groove recording system.

Figure 20:
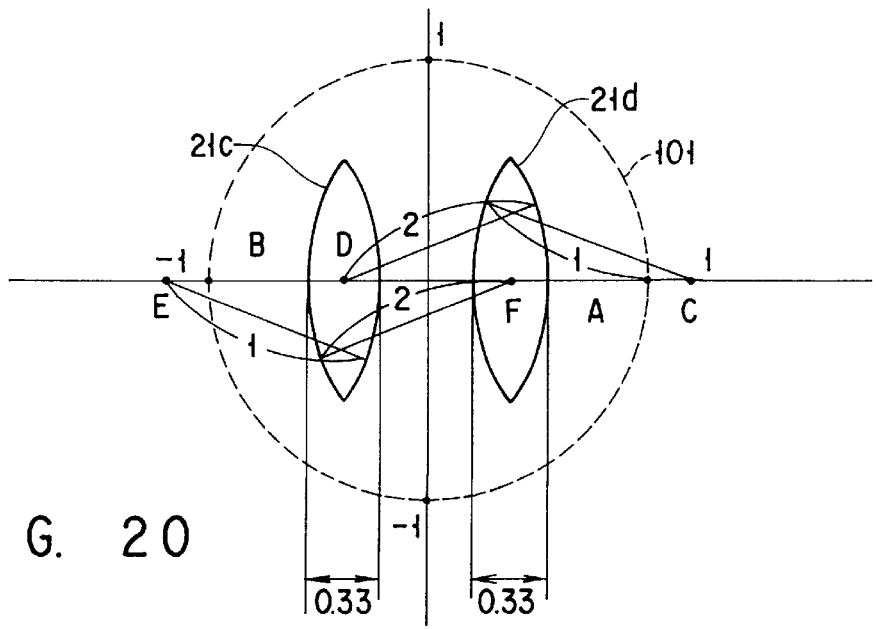
FIG. 20 is a view illustrating the tracking error detection areas in the second embodiment.

More specifically, in FIG, 18, when a track pitch is Tp=0.75 μm, by setting the center position of the tracking error detection areas 21c and 21d in a position away by 0.38 more than a diameter of the reflected light beam 101 from the optical disk 7, an offset in the tracking error signal can be reduced to almost zero. In FIG. 18, sizes of the tracking error detection areas 21c and 21d are set to values shown in FIG. 20 with respect to the reflected light beam 101. In an example in FIG. 20, a diameter of the reflected light beam 101 is set to 1 and sizes of the tracking error detection areas 21c and 21d in the track width direction are set to 0.33. When a track pitch is Tp=0.74 μm, the center position of the tracking error detection areas 21c and 21d may be set in a position away by about 0.35 more than the diameter of the reflected light beam 101. Further, when a track pitch is Tp=0.7 nm, the center position of the tracking error detection areas 21c and 21d may be set in a position away by about 0.18 more than the diameter of the reflected light beam 101.

In FIG. 19, when a track pitch is Tp=0.587 µm, the center position of the tracking error detection areas 21c and 21d must be set in a position away by about 0.38 more than the diameter of the reflected light beam 101.

As described above, usually, when a track pitch is 0.75 µm, since an offset in the tracking error signal amount permitted for the tracking error detection optical system is about 0.02 µm, the center position of the tracking error detection areas 21c and 21d may be selected in a position away by about 0.18 to 0.45 more than the diameter of the reflected light beam 101. Also, since an offset in the tracking error signal amount permitted for the tracking error detection optical system is about 0.02 µm when a track pitch Tp=0.7 µm, the center position of the tracking error detection areas 21c and 21d may be set from about 0.18 to 0.4 of the diameter of the reflected light beam 101.

Also, since an offset in the tracking error signal amount permitted for the tracking error detection optical system is about 0.16 µm when a track pitch in FIG. 19 is Tp=0.587 µm, the center position of the tracking error detection areas 21c and 21d may be set to one of about 0.18 to 0.57 of the diameter of the reflected light beam 101.

Therefore, it can be understood that when a track pitch Tp is within the range of 0.7 to 0.75 µm usually employed for the optical disk of the land and groove recording system, by setting the center position of the tracking error detection areas 21c and 21d from 0.18 to 0.5 of the diameter of the reflected light beam 101, an offset in the tracking error signal can be effectively reduced.

As in the case of the first embodiment, in FIG. 18, under Tp=0.75 µm, λ=680 nm and NA=0.6, Tp/λ×NA=0.62 is realized. In FIG. 8, under Tp=0.587 µm, λ=532 nm and NA=0.6, Tp/λ×NA=0.66 is realized. In both FIGS. 18 and 19, the center position of the tracking error signal detection areas 21c and 21d is about 0.38 of the diameter of the reflected light beam 101 and an offset in a tracking error signal is reduced to almost zero. Therefore, by means of a value determined by a relational expression of a track pitch, a wavelength of the laser light source 1 and NA of the objective lens 6, it is possible to determine areas in which an offset in a tracking error signal can be reduced. Furthermore, if Tp/λ×NA is about 0.66, the center position of the tracking error detection areas 21c and 21d is set to about 0.18 to 0.5 of the diameter of the reflected light beam 101 and thereby an offset in the tracking error signal can be effectively reduced.

In FIG. 18, under Tp=0.75 µm, λ=680 nm and NA=0.6, Tp/λ×NA=0.62 is realized.

Furthermore, FIG. 18 shows a result of calculation performed under the condition that the tracking error detection areas 21c and 21d are not brought into contact with the beam center of the reflected light beam 101. Thus, there is a lower limit to the center position of the areas 21c and 21d and in FIG. 18 of the diameter of the reflected light beam 101 is a lower limit thereof.

Figure 21A:
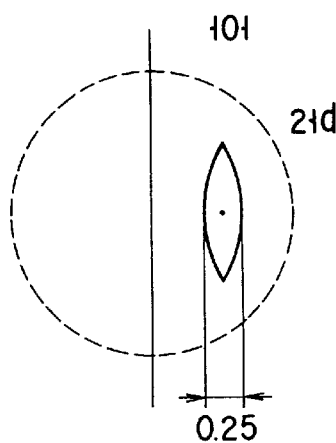
FIGS. 21A to 21C are views showing tracking error detection areas of various sizes in the second embodiment.
Figure 21B:
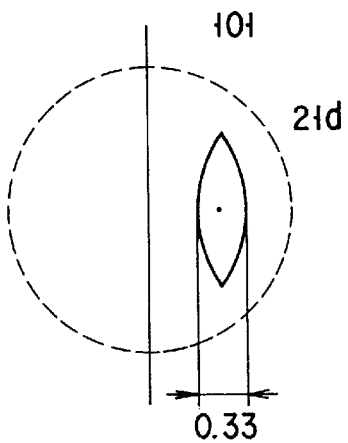
Figure 21C:
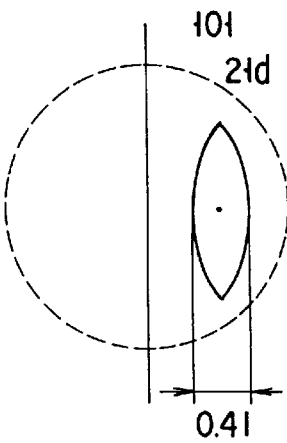

FIGS. 21A to 21C are views illustrating various sizes of the tracking error detection areas 21c and 21d, and for the purpose of simplifying explanation, only the tracking error detection area 21d in the right side is only shown. In actuality, the tracking error detection area 21c having the same form and placed in the same position away from the center point of the reflected light beam 101 exists in the left side.

Figure 22:
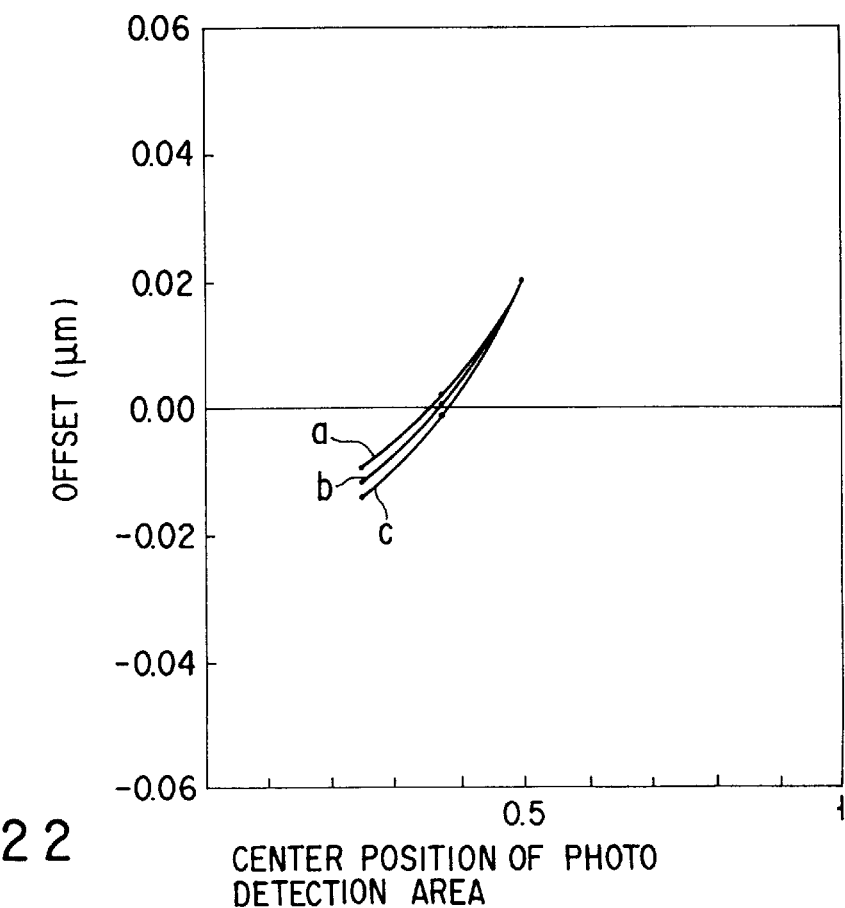
FIG. 22 is a view showing a relationship between a center position of the two tracking error detection areas having different sizes and an offset in the tracking error signal.

FIG. 22 shows a result of calculating an offset in the tracking error signal when the tracking error detection areas 21c and 21d having the sizes shown in FIGS. 21A to 21C are used. It is clear from this result that by optimally selecting the center position of the tracking error detection areas 21c and 21d within the range of 0.25 to 0.5 considering sizes and forms, an offset in the tracking error signal can be effectively reduced more.

A principle of reducing an offset in the tracking error signal in the embodiment may be explained, as in the case of the first embodiment, by referring to FIG. 9 or 10. That is, as shown in FIG. 10, outer and inner side areas are set with a position in which intensity distributions of the diffraction lights of the adjacent marks are reversed in polarity as a border, the center of the photodetection areas is positioned in the vicinity of the border and positions and sizes of the photodetection areas in which effects between the inner and outer sides are balanced are set. This makes it possible to reduce effects of the adjacent marks and an offset in a tracking error signal almost to zero.

On the other hand, in the second embodiment, by setting positions, forms and sizes of the tracking error detection areas 21c and 21d of the HOE 21 avoiding areas 81, 82, 83 and 84 as main causes of an offset in the tracking error signal, an offset in the tracking error signal can be reduced.

In the foregoing description of the preferred embodiments, reference was made to the optical disk of the land and groove recording system. In the case of an optical disk in which recording marks exist only on a groove or a land, when a track pitch is narrow, effects of diffraction lights by the recording marks on adjacent tracks appear as an offset during detecting of tracking errors by means of the push-pull method. Thus, in this case, the invention can also be employed so as to reduce an offset in the tracking error signal. In conclusion, the invention is effective in reducing an offset in the tracking error signal in all the optical disks with narrow track pitches.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An optical information recording/reproducing apparatus for optically recording/reproducing information by irradiating a track on a recording medium with a light comprising:

detecting means for selectively detecting an area of a reflected light beam smaller than a beam cross-section of a light beam reflected from the recording medium and obtaining an output signal corresponding to the area;

tracking error signal producing means for producing, from the output signal of the detecting means, a tracking error signal indicating a shift in a position of the light beam irradiated on the recording medium in a track width direction; and tracking control means for controlling an irradiation position of a light beam irradiated on the recording medium in the track width direction based on the tracking error signal, wherein the detected area has a width that is from 0.2 times to less than 1.0 times the beam diameter of the light beam reflected from the recording medium, said track has a land area and a groove area which are alternately disposed, and information is recorded on both of the land area and the groove area and wherein, when a track pitch Tp, provided in micrometers, on the recording medium, a wavelength λ, provided in micrometers, of a light beam for recording/reproducing information on the recording medium and NA of an objective lens for condensing the light beam in a very small beam spot on the recording medium satisfy the rational expression, $$0.62 \leq Tp/\lambda \times NA \geq 0.66,$$

the detecting means selectively detects a circular area having a diameter whose size is 0.23 to 0.86 times the beam diameter of the light beam reflected from the recording medium and obtains an output signal corresponding to the circular area.

2. An optical information recording/reproducing apparatus according to claim 1, wherein the recording medium is structured by alternately disposing areas different in height, and information is recorded in the alternately disposed areas as tracks.

3. An optical information recording/reproducing apparatus according to claim 1, wherein, when the track pitch on the recording medium is 0.75 μm to 0.74 μm, the detecting means selectively detects a circular area having a diameter whose size is 0.4 to 0.8 times the beam diameter of the light beam reflected from the recording medium and obtains an output signal corresponding to the circular area.

4. An optical information recording/reproducing apparatus according to claim 3, wherein the recording medium is structured by alternately disposing areas different in height, and information is recorded in the alternately disposed areas as tracks.

5. An optical information recording/reproducing apparatus according to claim 1, wherein, when the track pitch on the recording medium is 0.7 μm, the detecting means selectively detects a circular area having a diameter whose size is 0.23 to 0.6 times the beam diameter of the light beam reflected from the recording medium and obtains an output signal corresponding to the circular area.

6. An optical information recording/reproducing apparatus according to claim 5, wherein the recording medium is structured by alternately disposing areas different in height, and information is recorded in the alternately disposed areas as tracks.

7. An optical information recording/reproducing apparatus according to claim 1, wherein the detected area is an area which is symmetrical with respect to a center axis with a bisector in parallel with a track tangential direction of a photodetector as a center axis and has a width from 0.2 to ⅓ times the diameter of the reflected beam.

8. An optical information recording/reproducing apparatus according to claim 7, wherein the recording medium is structured by alternately disposing areas different in height, and information is recorded in the alternately disposed areas as tracks.

9. An optical information recording/reproducing apparatus according to claim 7, wherein two limited areas in the vicinity of the center of the photodetector are each used as an area having a width from 0.2 to ⅓ times the diameter of the reflected beam, and the tracking error signal is produced in such a manner that with detected signals of the areas as A and B respectively, A−B or (A−B)/(A+B) is calculated.

10. An optical information recording/reproducing apparatus according to claim 9, wherein, as the two limited areas, two leaf-shaped areas respectively having widths from 0.2 to ⅓ times the diameter of a beam spot irradiated an the photodetector in a track radial direction ar e used.

11. An optical information recording/reproducing apparatus according to claim 10, wherein the recording medium is structured by alternately disposing areas different in height, and information is recorded in the alternately disposed areas as tracks.

* * * * *